(12) United States Patent
Erdtmann (10) Patent No.: US 7,652,250 B2
(45) Date of Patent: Jan. 26, 2010

(54) NOISE REDUCTION METHOD FOR IMAGING DEVICES

(76) Inventor: Matthew Erdtmann, 24 Ridgemont Dr., Londonderry, NH (US) 03053

( * ) Notice: Subject to any disclaimer, the term of this patent is extended or adjusted under 35 U.S.C. 154(b) by 550 days.

(21) Appl. No.: 11/474,893

(22) Filed: Jun. 26, 2006

(65) Prior Publication Data

US 2007/0296838 A1 Dec. 27, 2007

(51) Int. Cl.
*H01L 25/00* (2006.01)
(52) U.S. Cl. ............ 250/332; 348/241; 250/338.1
(58) Field of Classification Search ........... 250/332, 250/338.1
See application file for complete search history.

(56) References Cited

U.S. PATENT DOCUMENTS

| | | | |
|---|---|---|---|
| 5,021,663 A * | 6/1991 | Hornbeck | 250/349 |
| 5,432,893 A * | 7/1995 | Blasubramanian et al. | 345/600 |
| 5,929,440 A | 7/1999 | Fisher | |
| 6,080,988 A | 6/2000 | Ishizuya et al. | |
| 6,118,124 A | 9/2000 | Thundat et al. | |
| 6,140,646 A * | 10/2000 | Busta et al. | 250/332 |
| 6,222,454 B1 * | 4/2001 | Harling et al. | 340/584 |
| 6,339,219 B1 | 1/2002 | Ishizuya et al. | |
| 6,469,301 B1 | 10/2002 | Suzuki et al. | |
| 6,586,738 B2 * | 7/2003 | Dausch et al. | 250/338.3 |
| 6,681,054 B1 | 1/2004 | Gindele et al. | |
| 6,718,068 B1 | 4/2004 | Gindele et al. | |
| 6,728,317 B1 * | 4/2004 | Demos | 375/240.21 |
| 6,835,932 B2 | 12/2004 | Ishizuya et al. | |
| 6,909,459 B2 | 6/2005 | Watson, Jr. et al. | |
| 6,972,868 B1 * | 12/2005 | Gondek et al. | 358/1.9 |
| 7,027,193 B2 | 4/2006 | Spears et al. | |
| 2005/0082480 A1 | 4/2005 | Wagner et al. | |
| 2007/0116383 A1 * | 5/2007 | De Haan | 382/299 |

FOREIGN PATENT DOCUMENTS

GB    2272285    5/1994

OTHER PUBLICATIONS

Meng Zhao, Jorge A. Leitao and Gerald de Haan; Towards an Overview of Spatial Up-Conversion Techniques; 2002; Eindhoven University of Technology, The Netherlands and Philips Research Laboratories Eindhoven, The Netherlands.*

* cited by examiner

*Primary Examiner*—Jason Chan
*Assistant Examiner*—Cynthia Calderon
(74) *Attorney, Agent, or Firm*—Michael Crilly, Esq.

(57) ABSTRACT

A method for reducing the noise equivalent temperature difference associated with imaging devices having a detection array including micro-cantilevers and a charged-coupled device or a complementary metal oxide semiconductor imager is presented. The method includes calculating horizontal and vertical pixel ratios based upon the number of receptor pixels and micro-cantilever pixels, defining composite pseudo-pixels comprised of at least two receptor pixels, capturing at least one frame of an image, calculating the composite intensity for each composite pseudo-pixel based on the intensities of the receptor pixels therein, and reconstructing each frame so that receptor pixels within each composite pseudo-pixel are displayed with the appropriate composite intensity. While the present method lowers pixel resolution, the composite pseudo-pixels maintain image resolution within the reconstructed image.

12 Claims, 6 Drawing Sheets

*Fig. 1*

Prior Art

Prior Art

Fig. 2

Before Spatial Averaging

After Spatial Averaging

*Prior Art*

*Fig. 3*

*Prior Art*

Before Pixel Averaging

*Fig. 5b*

After Pixel Averaging $I_c = (I_1 + I_2 + I_3 + I_4)/4$

NOISE REDUCTION METHOD FOR IMAGING DEVICES

CROSS REFERENCE TO RELATED APPLICATIONS

None.

FEDERALLY SPONSORED RESEARCH AND DEVELOPMENT

None.

BACKGROUND OF THE INVENTION

1. Field of the Invention

The present invention generally relates to a method for reducing the noise equivalent temperature difference (NETD) associated with imaging devices including a focal plane array of micro-cantilevers and a charged-coupled device (CCD) or a complementary metal oxide semiconductor (CMOS) imager, wherein the pixel density within the imager is greater than the number of micro-cantilevers within the camera.

2. Description of the Related Art

Traditional thermal cameras employ the thermo-electric effect to detect infrared (IR) signals via either current or voltage changes resulting from the temperature rise within a pixilated semiconductor. However, presently known technologies have several major deficiencies.

The sensitivity of IR cameras is fundamentally limited by electron thermal noise. Cooling devices are typically employed to mitigate electron thermal noise so as to improve sensitivity; however, this increases the power requirements and bulk of a camera system.

The fabrication of cooled IR cameras is both complex and costly because of the electrical interconnects required between pixels and integrated scanning readout electronics. Accordingly, such cameras are too costly for most commercial applications and too difficult to scale, thus limiting pixel density and array size which constrain image resolution. Furthermore, contact between electrical readout and sensor elements inevitably reduces sensitivity because of thermal signal leaks.

Uncooled thermal imagers avoid some of the problems of cooled devices by employing passive thermal bending and optical readout. Uncooled thermal imagers include bi-material micro-cantilever devices described by Ishizuya et al. in U.S. Pat. No. 6,835,932, Suzuki et al. in U.S. Pat. No. 6,469,301, Ishizuya et al. in U.S. Pat. No. 6,339,219, Thundat et al. in U.S. Pat. No. 6,118,124, Ishizuya et al. in U.S. Pat. No. 6,080,988, and Fisher in U.S. Pat. No. 5,929,440.

In Suzuki, an array of bi-material micro-cantilevers is described for infrared imaging based upon the direct conversion of an infrared signal to a visible signal. This approach includes passive sensors without electrical contacts, thus eliminating both electron thermal noise and pixel-level driving circuitry. However, the sensitivity of this and similar devices is highly dependent on optical readout methods and signal processing algorithms.

Figure 1:
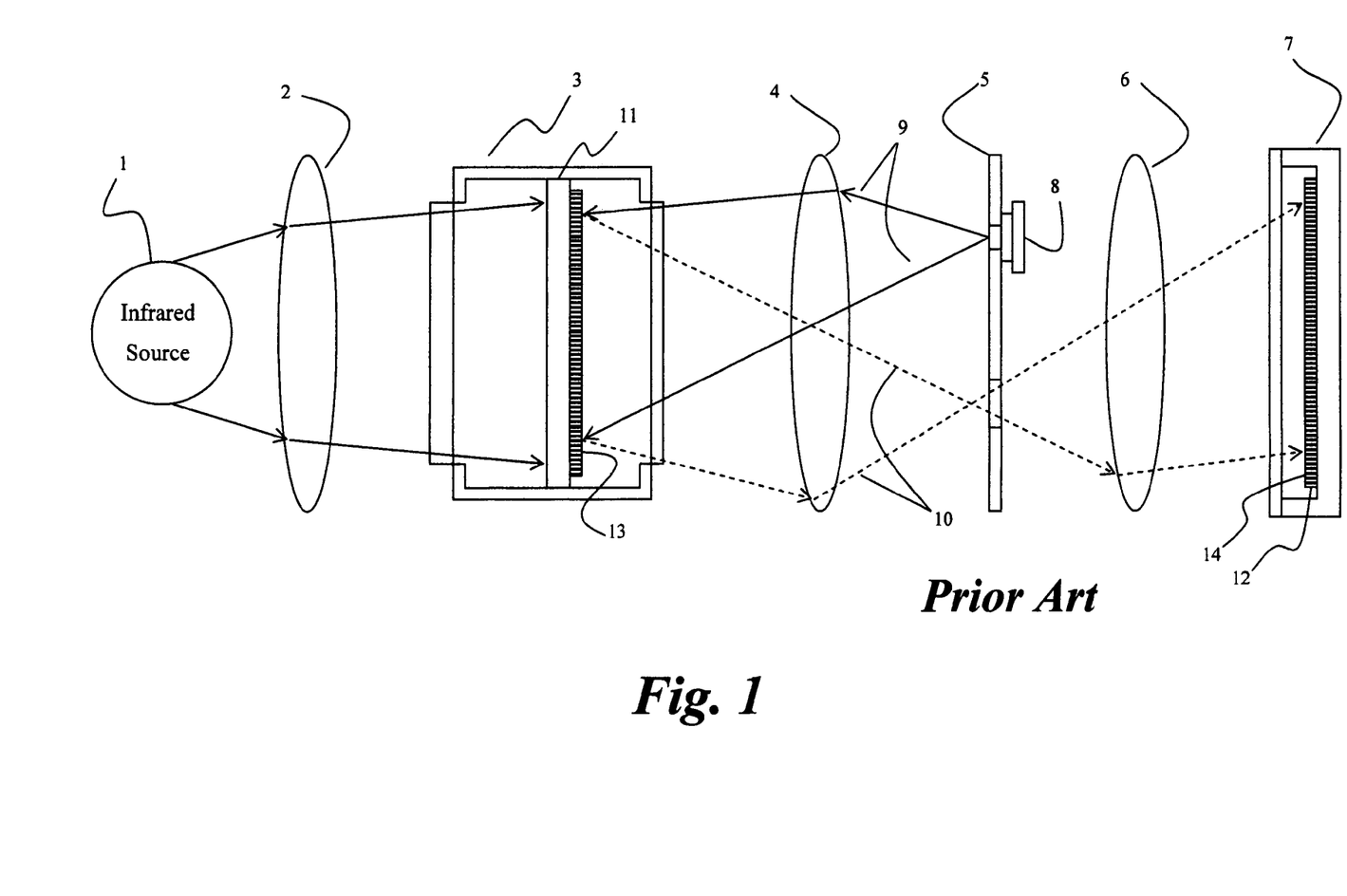
FIG. 1 is a schematic diagram showing an exemplary imaging device including an array of micro-cantilever pixels within an optical readout camera and an array of receptor pixels within an imager.

FIG. 1 shows an exemplary bi-material cantilever (BC) detector described by Ishizuya et al. (U.S. Pat. No. 6,339,219) which includes an infrared lens system 2, an infrared detection array 3, a first lens system 4, an aperture plate 5, a second lens system 6, and an imager 7 arranged in the order described. Within the front end of the apparatus, rays from a source 1 pass through the infrared lens system 2 and are thereafter directed onto the infrared detection array 3. The infrared detection array 3 includes a focal plane array 11 of micro-cantilever pixels 13 which is mechanically responsive to the thermal loading caused by the infrared rays. Within the back end of the apparatus, micro-cantilever pixels 13 reflect the incident light 9 from a visible light source 8, one example being a light emitting diode (LED), so that the reflected light 10 passes through the first lens system 4 which compresses the reflected light 10 allowing it to pass through a hole along the aperture plate 5. The reflected light 10 then passes through a second lens system 6 which expands the reflected light 10 so as to impinge a focal plane array 12 of receptor pixels 14 within the imager 7, examples being a complementary metal oxide semiconductor (CMOS) device or charged-coupled device (CCD). Thereafter, the resultant image is communicated to a video display device.

Figure 2:
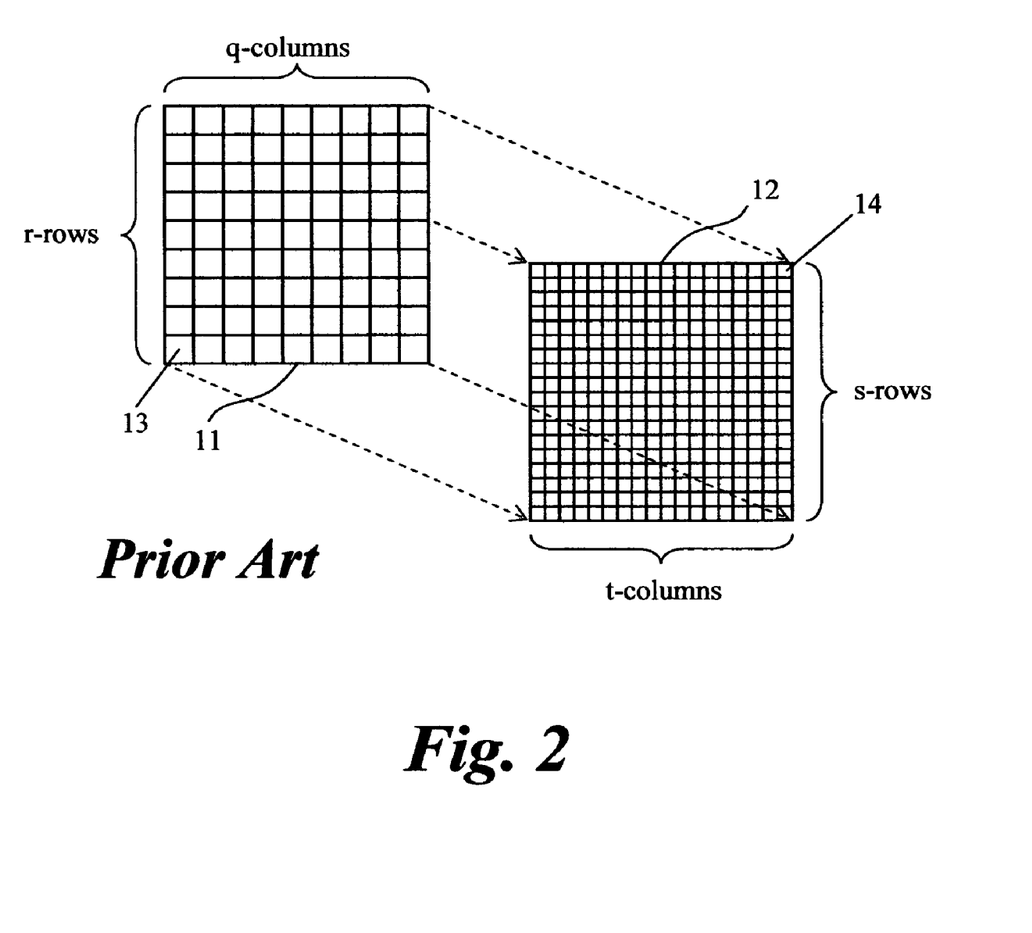
FIG. 2 is a schematic diagram showing the mapping of micro-cantilever pixels onto the receptor pixels within an imager.

Low-cost CMOS or CCD imagers 7 facilitate a significantly larger number of receptor pixels 14 than the number of micro-cantilever pixels 13 within the infrared detection array 3. As such, ratios of 4-to-1, 9-to-1, 16-to-1 and higher are possible. FIG. 2 shows a schematic representation wherein the imaging device has four receptor pixels 14 for every one micro-cantilever pixel 13.

The system noise within an imaging device, which directly influences image quality, is limited by the shot noise inherent to CMOS and CCD imagers. For example, the RMS (root-mean square) fluctuation, $n_{rms}$, of signal electrons caused by shot noise is equal to $\sqrt{n}$, where n is the number of signal electrons generated within the CMOS or CCD well. As a function of the total signal, the shot noise $\langle i_s \rangle$ is equal to $$\langle i_s \rangle = \frac{\sqrt{n}}{n} = \frac{1}{\sqrt{n}}, \tag{1}$$

where $\langle i_s \rangle$ can be expressed in terms of a percent (%).

Shot noise is a critical parameter because it facilitates a reduction in the noise equivalent temperature difference (NETD) for the overall imaging device. NETD is the ratio of system noise to system responsivity, which is equal to $$NETD = \frac{\langle i_s \rangle}{\Re} = \frac{1}{\Re\sqrt{n}}, \tag{2}$$

where $\Re$ is the system responsivity with units of percent signal change per degree Kelvin change in background temperature. Equation (2) clearly shows that NETD may be improved by either decreasing the shot noise ($\langle i_s \rangle$) or increasing the responsivity ($\Re$) of the detector.

Shot noise may be reduced by increasing the number of signal electrons as suggested by the inverse square root dependence in Equation (2). Signal electrons are increased by collecting more of them within the well of each pixel along the focal plane array within the CMOS or CCD. This approach maximizes n and minimizes $n^{-1/2}$ for a given design. However, the welt capacity of CMOS or CCD imagers is currently limited to approximately $5 \times 10^5$ electrons.

Two hardware independent methods, namely, spatial and temporal averaging, are known within the art to reduce shot noise by exploiting the statistical nature of shot noise. Shot noise has a Poisson distribution in both space and time such that the fluctuations at each pixel are independent of neighboring pixels within the same frame and independent between sequential frames for a given pixel.

Figure 3:
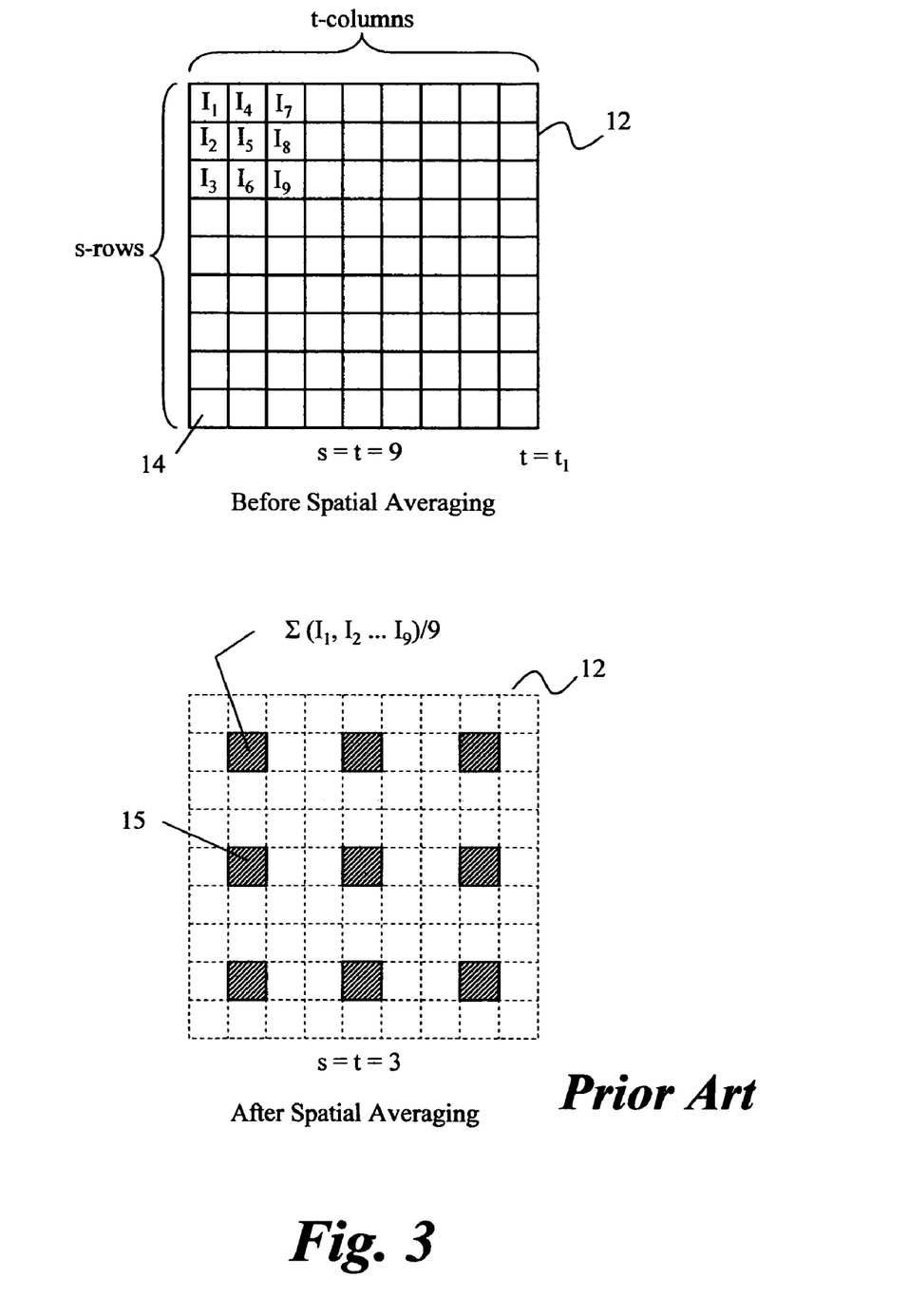
FIG. 3 is a schematic diagram showing a focal plane array of receptor pixels before and after spatial averaging of intensity.

Spatial averaging is a numerical method whereby the intensities for a fixed number of adjacent pixels within each group are combined, averaged, and assigned to a single pixel within the group. The resulting image has a resolution lowered by a factor of the number of pixels within the group. For example, FIG. 3 shows a 9-by-9 focal plane array 12 of receptor pixels 14, wherein each group includes nine pixels with intensities $I_1$-$I_9$ before spatial averaging. After spatial averaging, the numerical average of the group is assigned to the centermost pixel or the spatial averaged pixel 15. The resultant image after averaging has a resolution that is one-ninth that before averaging. Accordingly, spatial averaging lowers image resolution and causes significant loss of image detail.

Figure 4:
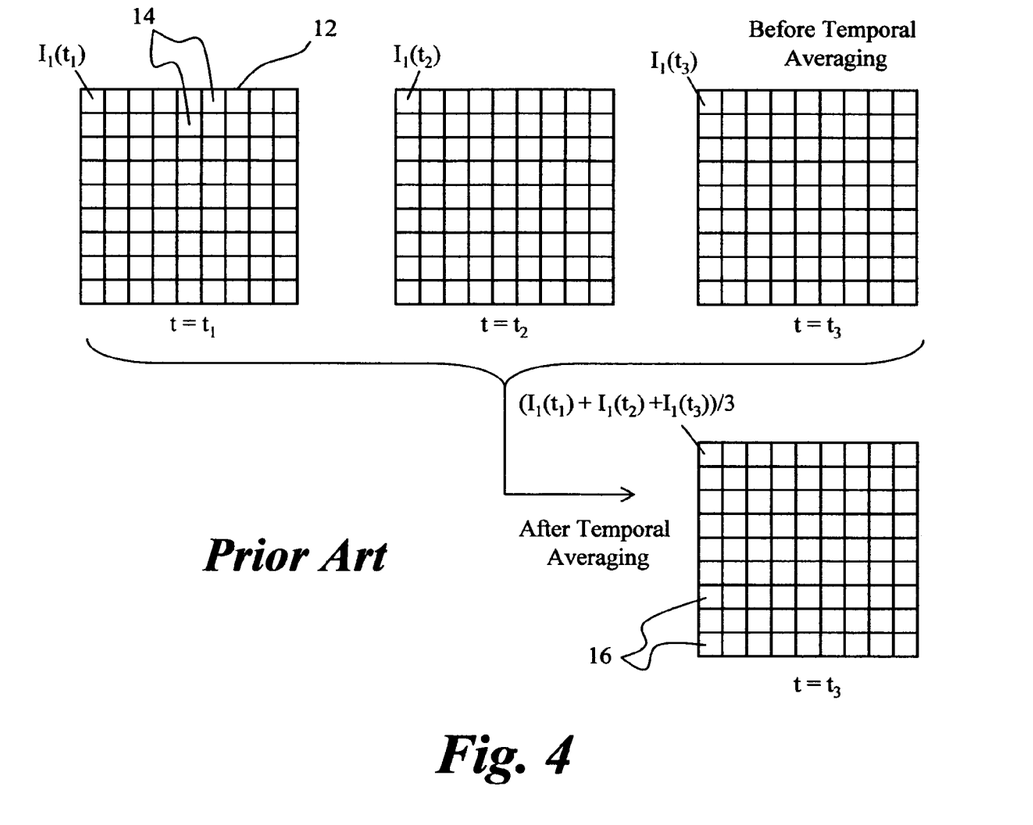
FIG. 4 is a schematic diagram showing a focal plane array of receptor pixels before and after temporal averaging of intensity.

Temporal averaging is another numerical method whereby the intensities, $I_1(t_1)$, $I_1(t_2)$, and $I_1(t_3)$ in the example in FIG. 4, for the same pixel are averaged over a fixed number of sequential frames and thereafter assigned to the temporal averaged pixel 16 within one frame. In this method, averaging may include a combining average, whereby several frames are averaged to form one new frame and the other frames are discarded, as shown in FIG. 4, or a rolling average, whereby each frame is equal to the average of itself and several previous frames. The combining average method reduces the frame rate by the inverse of the number of frames averaged, thus effectively slowing detector speed. The rolling average method maintains the original frame rate; however, the successive averaging of intensities filters the image, thus reducing resolution.

Gindele et al. in U.S. Pat. Nos. 6,718,068 and 6,681,054, and Smith in U.K. Patent No. 2,272,285 describe other noise reduction methods for digital images. Both methods act as noise "filters" by attempting to correct the intensity of "noisy" pixels via numerical weighting and averaging approaches based on the intensity of neighboring pixels, rather than the combination of pixels.

Therefore, what is required is a noise reduction method which reduces the noise equivalent temperature difference (NETD) associated with an imaging device without compromising the resolution and quality of the image captured by the CMOS or CCD device.

SUMMARY OF INVENTION

An object of the present invention is to provide a noise reduction method which reduces the noise equivalent temperature difference (NETD) associated with an imaging device without compromising the resolution and quality of the image captured by the CMOS or CCD device.

The inventive method of the present invention includes calculating a horizontal pixel ratio and a vertical pixel ratio based upon a plurality of receptor pixels within an imager and a plurality of micro-cantilever pixels within an infrared detection array, defining a plurality of composite pseudo-pixels within the imager based on the horizontal and the vertical pixel ratios so that each composite pseudo-pixel comprises at least two receptor pixels, capturing at least one frame having an image thereon with the infrared detection array and imager, calculating a composite intensity for each composite pseudo-pixel based on an intensity for each receptor pixel within the composite pseudo-pixel, and reconstructing each frame so that each receptor pixel within each composite pseudo-pixel has the appropriate composite intensity.

The present inventive method is not restricted to bi-material micro-cantilever detectors. As such, the method is applicable to any detector having a focal plane array whose responsivity data is collected by any optical readout system. For example, the focal plane array may have pixels sensitive to a region of the spectrum not accessible with conventional CMOS or CCD imagers. The interrogation of each pixel may be via pixel reflection, transmission, refraction, absorption, polarization, or some other optical property that changes with responsivity of pixels within the focal plane array.

The present method is not restricted to numerical averaging. Other statistical and probabilistic methods understood in the art are possible to derive a single, representative intensity for the receptor pixels comprising each composite pseudo-pixel. These methods include without limitation calculating the median average or a weighted average based on the intensity, intensity gradient, and distance from the center pixel or another factor.

The primary advantage of the present inventive method is that it reduces the noise equivalent temperature difference (NETD) associated with an imaging device without compromising the resolution and quality of the image captured by the CMOS or CCD imager. The combination of m adjacent pixels yields a composite pseudo-pixel having an effective well capacity of mn. Thus shot noise, and hence NETD, is reduced by a factor of $\sqrt{m}$ as shown in Equation (3) below.

$$NETD = \frac{1}{R\sqrt{mn}} \qquad (3)$$

REFERENCE NUMERALS

1 Source
2 Infrared lens system
3 Infrared detection array
4 First lens system
5 Aperture plate
6 Second lens system
7 Imager
8 Light source
9 Incident light
10 Reflected light
11 Focal plane array
12 Focal plane array
13 Micro-cantilever pixel
14 Receptor pixel
15 Spatial averaged pixel
16 Temporal averaged pixel
17 Composite pseudo-pixel
21-27 Step
$I_1$-$I_9$ Intensity
$I_c$ Composite intensity

BRIEF DESCRIPTION OF THE DRAWINGS

The invention will now be described in more detail, by way of example only, with reference to the accompanying drawings, in which.

DETAILED DESCRIPTION OF THE INVENTION

The present method is applicable to a variety of detectors including a focal plane array of micro-cantilever pixels 13 sensitive to a spectral region not accessible with CMOS, CCD, or other similar imaging devices, as shown in FIG. 1. The responsivity data captured by the micro-cantilever pixels 13 is measured by an optical readout system and transferred to a CMOS or CCD imager 7. Density and resolution of receptor pixels 14 within the CMOS or CCD imager 7 is greater than that of the micro-cantilever pixels 13. This arrangement ensures that the image captured by each micro-cantilever pixel 13 is transferred to multiple receptor pixels 14. Each receptor pixel 14 collects photons independently of the other receptor pixels 14.

Figure 5A:
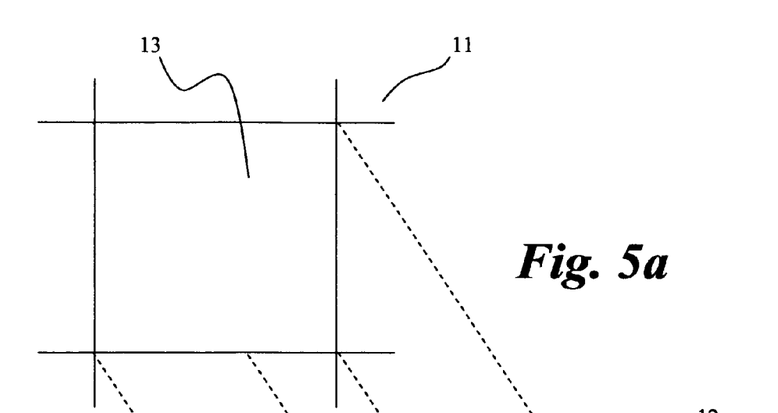
FIGS. 5a-5c are a schematic diagram of one exemplary embodiment of the present invention showing the mapping of one micro-cantilever pixel onto four receptor pixels each having an intensity which are numerically averaged and assigned to the four receptor pixels within the newly formed composite pseudo-pixel.
Figures 5B, 5C:
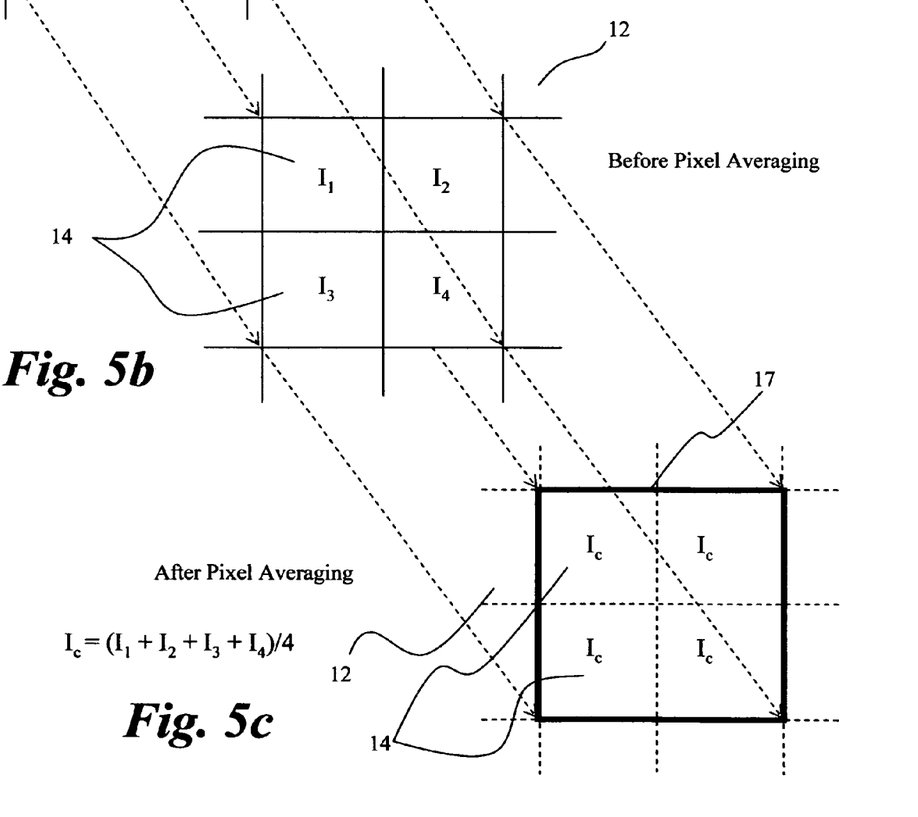

Referring now to FIGS. 5a-5c, an exemplary schematic for the present inventive method is shown for a receptor-to-micro-cantilever ratio of 4-to-1. In FIG. 5a, one micro-cantilever pixel 13 of many is shown within the focal plane array 11. In FIG. 5b, the micro-cantilever pixel 13 is sized to project onto four receptor pixels 14 within the second focal plane array 12. Each receptor pixel 14 has an intensity $I_1$, $I_2$, $I_3$, and $I_4$ which is collected independently of the other receptor pixels 14, although resulting from the same micro-cantilever pixel 13. The four intensities $I_1$-$I_4$ will vary because of statistical variations. In FIG. 5c, the receptor pixels 14 are combined to form a composite pseudo-pixel 17. The intensities $I_1$-$I_4$ within the four receptor pixels 14 are numerically averaged so as to arrive at a composite intensity $I_c$, which is then assigned to each receptor pixel 14 within the composite pseudo-pixel 17. The method is repeated until the intensities $I_1$-$I_4$ of all receptor pixels 14 are adjusted to represent the composite intensity $I_c$ values of all composite pseudo-pixels 17 within the focal plane array 12.

The number of receptor pixels 14 comprising a composite pseudo-pixel 17 is dependent on the horizontal pixel ratio and vertical pixel ratio of the system. While FIGS. 5a-5c show a square shaped composite pseudo-pixel 17, rectangular shaped composite pseudo-pixels 17 are likewise possible.

The horizontal pixel ratio (h) is equal to $$h = t/q \quad (4)$$

where t is the number of receptor pixels 14 along the horizontal within the second focal plane array 12 and q is the number of micro-cantilever pixels 13 along the horizontal within the first focal plane array 11, as shown in FIG. 2. The number of receptor pixels 14 along the horizontal of the composite pseudo-pixel 17 is equal to the whole number portion of the ratio. The decimal portion of the horizontal pixel ratio (h) represents overlapping projections of two micro-cantilever pixels 13 onto a single receptor pixel 14. While it is preferred for the horizontal pixel ratio (h) to be a whole number greater than zero, fractional overlapping is possible between adjacent composite pseudo-pixels 17. It is understood that additional numerical averaging may be required to properly represent the intensity of pixels about the boundary of the composite pseudo-pixel 17.

The vertical pixel ratio (v) is equal to $$v = s/r \quad (4)$$

where s is the number of receptor pixels 14 along the vertical within the second focal plane array 12 and r is the number of micro-cantilever pixels 13 along the vertical within the first focal plane array 11, as shown in FIG. 2. The number of receptor pixels 14 along the vertical of the composite pseudo-pixel 17 is equal to the whole number portion of the ratio. The decimal portion of the vertical pixel ratio (v) represents overlapping projections from two micro-cantilever pixels 13 onto a single receptor pixel 14. While it is preferred for the vertical pixel ratio (v) to be a whole number greater than zero, fractional overlapping is possible between adjacent composite pseudo-pixels 17. It is understood that additional numerical averaging may be required to properly represent the intensity of pixels about the boundary of the composite pseudo-pixel 17. Likewise, it is preferred for the horizontal pixel ratio (h) to equal the vertical pixel ratio (v) so as to provide square shaped composite pseudo-pixels 17.

Figure 6:
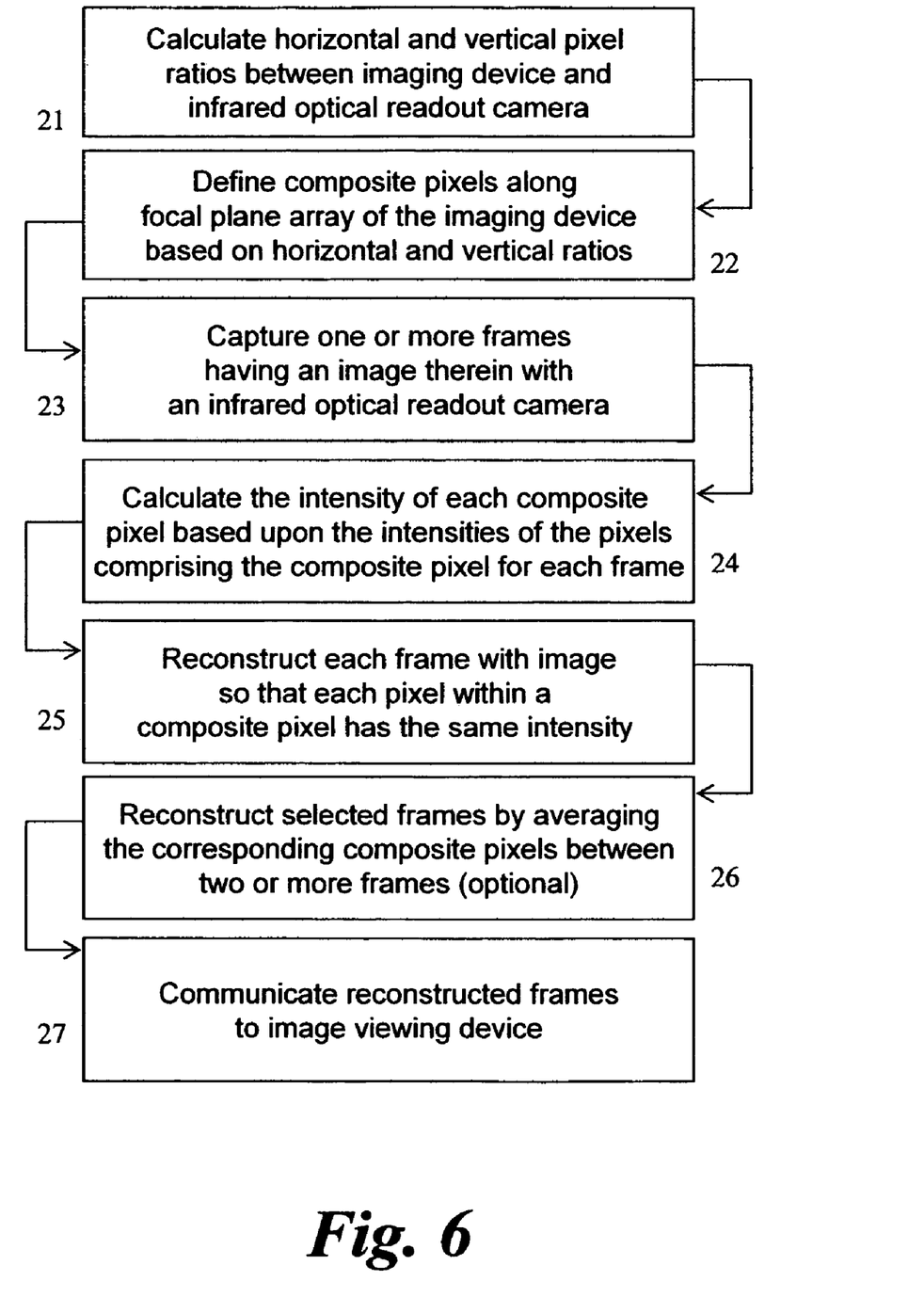
FIG. 6 is a flowchart describing the present invention.

Referring now to FIG. 6, the present invention is described in flowchart form including six separate steps with reference to elements in FIG. 1. The method may be implemented as software within the imager 7 or any suitable commercially available peripheral device, including but not limited to a video display device.

In step 21, a horizontal pixel ratio is calculated based on the number of pixels horizontally disposed along the focal plane array 12 within the imager 7 and the focal plane array 11 within the infrared detection array 3. Next, a vertical pixel ratio is calculated based on the number of pixels vertically disposed along the focal plane array 12 within the imager 7 and the focal plane array 11 within the infrared detection array 3. In step 22, a plurality of composite pseudo-pixels 17 are defined based upon the horizontal and vertical pixel ratios from step 21. For example, each composite pseudo-pixel along the focal plane array 12 would be composed of three rows of pixels where the vertical pixel ratio is three and four columns of pixels where the horizontal pixel ratio is four. Each composite pseudo-pixel 17 would be composed of twelve receptor pixels 14. Accordingly, each composite pseudo-pixel 17 may be comprised of N-by-N receptor pixels 14 where N is a whole number greater than 1 or M-by-N receptor pixels 14 where M is a whole number greater than 0 and N is a whole number greater than 1. The total number of composite pseudo-pixels 17 would depend on the total number of receptor pixels 14 within the imager 7.

In step 23, the imaging device captures one or more frames via the receptor pixels 14 via a technique understood within the art. Each receptor pixel 14 provides an intensity value representative of the light impinging thereon.

In step 24, the receptor pixels 14 are numerically processed for all composite pseudo-pixels 17. In this step, the individual intensifies are summed within each composite pseudo-pixel 17 and averaged to arrive at an intensity value which best represents the intensity of the light impinging the receptor pixels 14 comprising the composite pseudo-pixel 17 within the frame. Intensities are stored within a data array for all composite pseudo-pixels 17 within a given frame.

In step 25, the average intensity for each composite pseudo-pixel 17 is assigned to each receptor pixel 14 comprising the composite pseudo-pixel 17. In this step, each frame is reconstructed to generate an image that best represents the image captured by the infrared detection array 3.

Average densities are stored within a data array for all receptor pixels 14 within a given frame.

Step 26 is an optional step wherein data arrays from two or more frames are summed and averaged in a pixel-wise fashion and thereafter assigned to a data array. In this step, the number of arrays and corresponding frames after numerical averaging is at least as many as that before averaging.

In step 27, the intensity data for each frame is communicated to a commercially available image viewing device via techniques understood in the art for viewing.

The averaging and assignment of intensities for receptor pixels 14 within a composite pseudo-pixel 17 reduce shot noise without the data loss of other methods. If the NETD is limited by shot noise, it is generally reduced by the square root of the number of pixels within the set. A variety of numerical methods are applicable to calculating the composite intensity $I_c$ within non-overlapping and overlapping pixels, including without limitation summation averaging, weighted averaging based on intensity, intensity gradient, or distance, and other statistical and probabilistic methods. The resolution of the final image within the imager 7 after averaging is at least as detailed as the resolution provided by the infrared detection array 3, see FIGS. 1-2.

EXAMPLE CALCULATIONS

Below are exemplary calculations of the noise equivalent temperature difference (NETD) for an arbitrary imaging device wherein the infrared focal plane array 11 is assumed to have an array size of 160×120 micro-cantilever pixels 13 and the imager 7 is assumed to have an array size of 640×480 receptor pixels 14 (representative of VGA resolution), a well capacity of 20,000 electrons (n=20,000), and a frame rate of 90 fps. The IR responsivity of the system is assumed to be $\Re$=3.5%/K. As such, the system has a horizontal pixel ratio equal to 4, a vertical pixel ratio equal to 4, and a total pixel ratio of 16-to-1.

The shot noise limited NETD of the system without the present method is $$NETD = \frac{1}{\Re\sqrt{n}} = \frac{2}{0.035\sqrt{20{,}000}} = 202 \text{ mK}$$

based upon the parameters defined above.

The shot noise limited NETD of the system with the present method is $$NETD = \frac{1}{\Re\sqrt{mn}} = \frac{1}{0.035\sqrt{16 \cdot 20{,}000}} = 50.5 \text{ mK}$$

after summation, averaging, and assignment of the intensities for the 16 receptor pixels 14 (m=16) comprising each 4-by-4 composite pseudo-pixel 17. The net result is an NETD reduced by a factor 4 without pixel loss.

The present inventive method may also be coupled with temporal averaging if a further decrease of the NETD is required. In this example, the 16 receptor pixels 14 are averaged over three frames so that m is effectively 48 (3×16) pixels. The frame rate is decreased from 90 to 30 frames-per-second when the combining average method of temporal averaging is employed. The frame rate is unaffected when the rolling average method is employed. The NETD of the system with both the present method and temporal averaging is $$NETD = \frac{1}{\Re\sqrt{mn}} = \frac{1}{0.035\sqrt{48 \cdot 20{,}000}} = 29.2 \text{ mK}$$

which represents nearly an 85% reduction in the NETD for the assumed system.

The description above indicates that a great degree of flexibility is offered in terms of the present invention. Although methods have been described in considerable detail with reference to certain preferred versions thereof, other versions are possible. Therefore, the spirit and scope of the appended claims should not be limited to the description of the preferred versions contained herein.

The invention claimed is:

1. A noise reduction method for an infrared imaging devices comprising the steps of:
   (a) calculating a horizontal pixel ratio and a vertical pixel ratio based upon a plurality of receptor pixels within an imager and a plurality of pixels within an infrared detection array, said horizontal pixel ratio equal to the number of said receptor pixels horizontally disposed along said imager divided by the number of said pixels horizontally disposed along said infrared detection array, said vertical pixel ratio equal to the number of said receptor pixels vertically disposed alone said imager divided by the number of said pixels vertically disposed along said infrared detection array;
   (b) defining a plurality of composite pseudo-pixels within said imager based on said horizontal pixel ratio and said vertical pixel ratio, each said composite pseudo-pixel comprised of at least two said receptor pixels, each said receptor pixel within said imager assigned to at least one said composite pixel, the total number of said composite pixels equal to the total number of said pixels;
   (c) capturing at least one frame of an infrared image with said infrared detection array and said imager;
   (d) calculating a composite intensity for each said composite pseudo-pixel based on an intensity for each said receptor pixel within said composite pseudo-pixel; and
   (e) reconstructing said frame so that each said receptor pixel within said composite pseudo-pixel has said composite intensity.

2. The noise reduction method of claim 1, further comprising the step of:
   (f) communicating said frames to an image viewing device after said reconstructing step.

3. The noise reduction method of claim 1, further comprising the step of:
   (f) averaging said composite pseudo-pixels within at least two said frames.

4. The noise reduction method of claim 3, further comprising the step of:
   (f) communicating said frames to an image viewing device after said reconstructing step.

5. The noise reduction method of claim 1, wherein said imager is a CMOS device.

6. The noise reduction method of claim 1, wherein said imager is a charge-coupled device.

7. The noise reduction method of claim 1, wherein each said composite pseudo-pixel is comprised of N-by-N said receptor pixels where N is a whole number greater than 1.

8. The noise reduction method of claim 1, wherein each said composite pseudo-pixel is comprised of M-by-N said receptor pixels where M and N are whole numbers, M is greater than 0, N is greater than 1.

9. The noise reduction method of claim 1, wherein said calculating step is an average of said intensities for said receptor pixels within said composite pseudo-pixel.

10. The noise reduction method of claim 1, wherein said calculating step is a weighted average of said intensities for said receptor pixels within each said composite pseudo-pixel.

11. The noise reduction method of claim 1, wherein said calculating step is a weighted average of the gradient of said intensities within said composite pseudo-pixel.

12. The noise reduction method of claim 11, wherein said weighted average is spatially dependent within said composite pseudo-pixel.

* * * * *